United States Patent

Kuhn

[15] 3,707,596

[45] Dec. 26, 1972

[54] CIRCUIT ARRANGEMENT FOR SURPRESSING THE CHROMINANCE SUBCARRIER IN PAL SIGNAL

[72] Inventor: Klaus Kuhn, Kalenbarg, Germany

[73] Assignee: U.S. Philips Corporation, New York, N.Y.

[22] Filed: Dec. 14, 1970

[21] Appl. No.: 97,657

[30] Foreign Application Priority Data

Dec. 19, 1969 Germany ....................P 19 63 819.8

[52] U.S. Cl. ..............................................178/5.4 P
[51] Int. Cl. ..............................................H04n 9/02
[58] Field of Search ............................178/5.4, 5.4 P

[56] References Cited

UNITED STATES PATENTS 3,553,353 1/1971 Melchior..........................178/5.4 P

FOREIGN PATENTS OR APPLICATIONS 1,058,604 2/1967 Great Britain ....................178/5.4 P
1,266,348 4/1968 Germany..........................178/5.4 P

*Primary Examiner*—Richard Murray
*Attorney*—Frank R. Trifari

[57] ABSTRACT

A circuit for eliminating the color component of a composite television signal has two comb filters. Both filters have internal feedback and one uses subtraction, while the other uses addition. This prevents a loss of vertical definition in the picture.

5 Claims, 10 Drawing Figures

Figure 3:
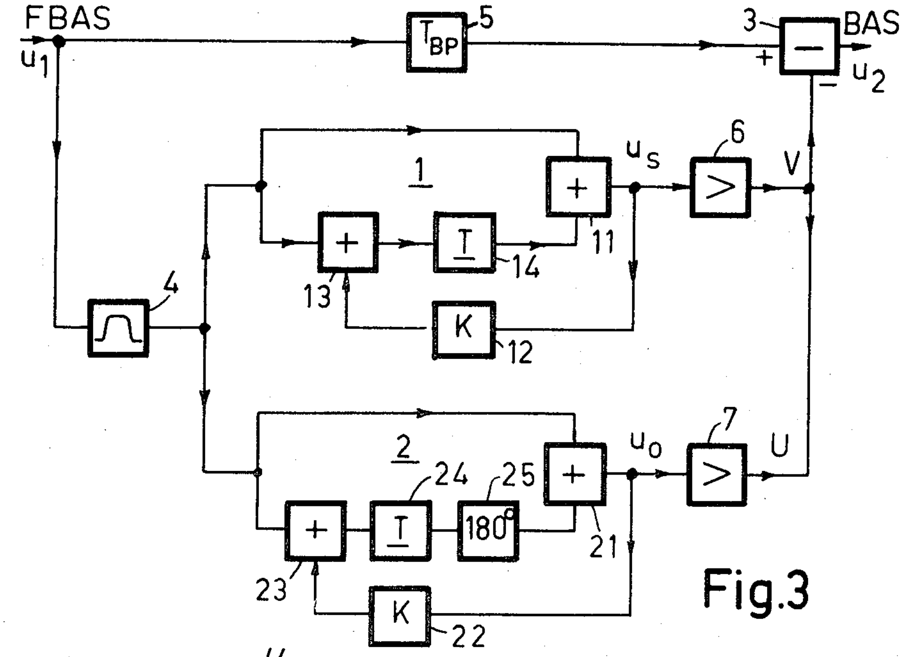

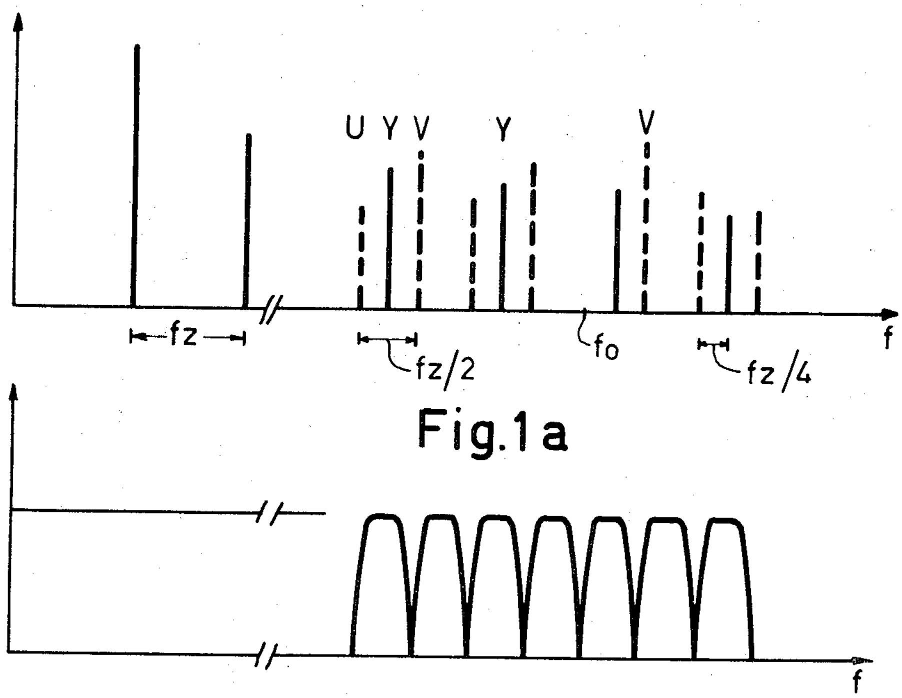
Fig.1a Fig.1b
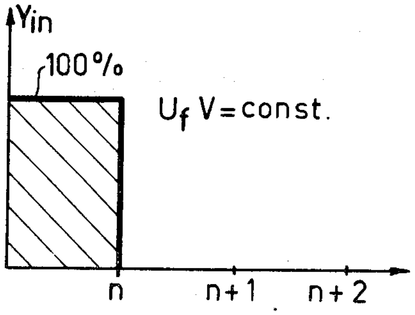
Fig 2a
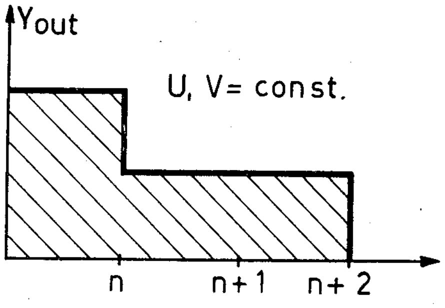
Fig.2b
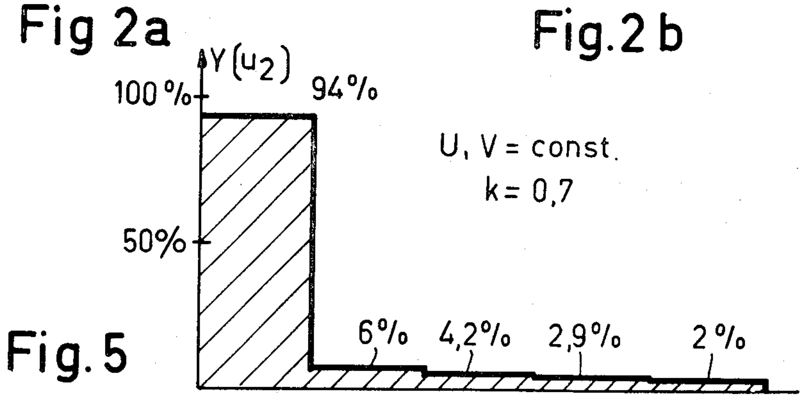
INVENTOR.
KLAUS KÜHN
BY
AGENT

*INVENTOR.*

KLAUS KÜHN

BY

AGENT

CIRCUIT ARRANGEMENT FOR SURPRESSING THE CHROMINANCE SUBCARRIER IN PAL SIGNAL

The invention relates to a circuit arrangement for suppressing the color information signal present in a video signal (FBAS signal) of a PAL color television signal.

The circuit arrangement is to separate the interlaced frequency spectral lines of the luminance signal and the chrominance signal and to suppress the chrominance signal. FIG. 1 shows the frequency spectrum of a PAL signal. The spectral lines or the components of the luminance (Y) signal are located at integral multiples of the line frequency $f_z$ and may extend into the frequency range of the chrominance subcarrier $f_o = 4.43$ MHz. In the frequency range of the chrominance subcarrier the spectral lines or the components of the color difference signals U, V and the chrominance sub carrier component are grouped around the Y-components, every time shifted over one fourth of the line frequency. In commercial TV receivers a bandpass filter or a wavetrap in the chrominance subcarrier range is considered to be satisfactory for the separation of the last-mentioned components from the luminance signal and interference in color and in the finer picture details are taken into account at the boundaries of the pass and suppression regions.

In transcoding, for example, of a video signal in accordance with the PAL standard into a signal in accordance with the SECAM standard, small amplitude signals at these boundaries cause disturbing interference in the SECAM chrominance subcarrier(s).

A filter for filtering the luminance signal Y should thus have a characteristic as shown in FIG. 1*b* in which the ratio of the output voltage relative to the input voltage is given as a function of the frequency. Filters having such a characteristic in which the zero points occur periodically along the frequency axis are called comb filters. In this case generally a signal is applied directly and through a delay line to an adder or subtractor circuit. The output voltage of such a circuit is then dependent on the phase shift caused in the signal by the delay line: at a phase shift of 180° a minimum (maximum) occurs at the output of the adder circuit (subtractor circuit) while at a phase shift of 0° or 360° a maximum (minimum) occurs. If the delay period T of the delay line is chosen to be as large as one line period $1/f_z$, the luminance signal may also be passed on or cut off at the high frequencies, dependent on whether the delayed and the undelayed signal are added together or subtracted from each other. On the other hand, if one of the components U or V of the color difference signal is to be filtered, the delay period T must be longer. In that case the following equation must be satisfied $1/T = f_z (1-e/n)$ wherein for PAL $e$=0.25 and $n$=284 (compare Telefunken Zeitung, Vol. 37 (1964) No. 2 pages 115–135).

Such comb filters have sometimes been used for separating the chrominance signal. However, a principal drawback of all these known circuits is the deterioration of the definition of the picture in the vertical direction. This will be explained in greater detail with reference to FIG. 2. It is assumed that the luminance from the end of a line *u* changes stepwise, that is to say, the Y-signal amplitude changes from, for example, 100 percent to 0. This luminance signal step at the input of the comb filter is shown in FIG. 2*a* as a function of the number of line periods. During the line $n + 1$ the undelayed Y-signal ($Y_{in}$) is 0; the delayed Y-signal has, however, still the value of 100 percent (from the previous line) so that after addition or subtraction of both the signals at the output of the comb filter a mean value near 50 percent of the previous output signal ($Y_{out}$) is produced (see FIG. 2*b*). Since in the PAL system the signal is to be partially delayed for two lines, a mean value is also produced during the line $n + 2$ and then only the output signal follows the input signal.

A further drawback is that without additional steps the pass regions always have the shape of half a period of sine curve. However, the comb filter must have a very wide pass region for the Y-signal, as is shown in FIG. 1*b*, because the spectrum of the Y-signal in contrast with the spectrum of the chrominance signal and being different from that shown in FIG. 1*a* does not have sharp lines in the region of the chrominance subcarrier. It is known from the said Article that the pass region may be formed in the desired manner by suitable feedback from the output of the comb filter to the input of the delay line. However, this causes the definition in the vertical direction to be still worse because the delayed signal is brought through the feedback to the input of the delay line again and this delay line continues again, although in a weaker form, so that the output signal of the comb filter cannot follow the step of the input signal during many line periods.

In a known circuit arrangement (Internationale Elektronische Rundschau 1969, No. 8 particularly FIG. 5) this integrating action of the comb filter which deteriorates the definition in the vertical direction is obviated to a great extent in that the video signal and the color information is divided with the aid of a highpass and a lowpass filter, in which only the portion of high frequency containing the color information is passed on to the comb filter, while the low-frequency portion which does not contain color information is delayed for one line period and undergoes a vertical aperture correction. However, the vertical aperture correction involves high costs.

An object of the present invention is to obviate the mentioned drawbacks. Starting from a circuit arrangement for suppressing the color information signal (F signal) present in a PAL color television signal (FBAS signal) by means of at least one comb filter which includes one delay line which delays the FBAS signal or the components of the FBAS signal located in the frequency range of the F signal by approximately the duration of the period of the line frequency, and adds the delayed signal to the undelayed signal or subtracts it therefrom and feeds back the sum or the difference to the input of the delay line, this object according to the invention is achieved in that at least the components of the FBAS signal located in the frequency range of the F signal are applied to the parallel-arranged inputs of two comb filters one of which adds the delayed signal to the undelayed signal, while the other subtracts the delayed signal from the undelayed signal, and in that the signals at the output of the comb filters are amplified by a given factor, added together and subtracted from the FBAS signal.

In order that the invention may be readily carried into effect an embodiment thereof will now be described in detail by way of example with reference to the accompanying diagrammatic drawings, in which:

FIG. 3 shows a block diagram of a circuit arrangement according to the invention, FIG. 4 shows the frequency characteristic of a transfer element used in the circuit arrangement of FIG. 3 for the total FBAS signal (4*a*), the frequency characteristic of the first comb filter (4*b*), the frequency characteristic of the second comb filter (4*c*) and the frequency characteristic at the output of a circuit arrangement according to FIG. 3 (4*d*).

FIG. 5 shows the variation with time of the output signal of the circuit arrangement of FIG. 3 when an input signal in accordance with FIG. 2*a* is changed.

In the circuit arrangement shown in FIG. 3 the video signal of a PAL color television signal including luminance and color information is applied to a bandpass filter 4 and to a delay line 5 whose delay period corresponds to the delay of the signals passing through the bandpass filter 4. The output of the delay line 5 is connected to a subtractor circuit 3. The bandpass filter 4 only passes those frequency components of the input signal which include color components and applies the signals filtered in this manner to the inputs of two comb filters 1 and 2 where output signals are amplified by amplifiers 6 and 7, respectively, added together and applied to the input of the subtractor circuit 3 where they are subtracted from the FBAS signal coming in through the delay element 5.

The bandpass filter 4 renders the use of simple delay lines having a small bandwidth (2 MHz) possible and ensures that the integrating action of the comb filter for the Y signal also occurring to a slight extent in the circuit arrangement according to the invention only exerts influence on the signal components of high frequencies.

The comb filters are in principle formed identically. Each comb filter includes an adder stage 11 and an adder stage 21, respectively, which add the delayed and the undelayed signal. The resultant signal is fed back from the output of the adder stage by means of a feedback network 12 (22) to the input of a further adder circuit 13 (23). This further adder circuit adds the feed-back signal and the output signal of the bandpass filter 1 and applies its output signal to the input of the delay line 14 (24) which delay line delays the signal by a period of T, in which for a conventional PAL signal the relation $1/T=f_z(1-e/n)$ with $e=0.25$ and $n=284$ is satisfied, and wherein $f_z$ is the line frequency. In addition the amplified signal in the comb filter 2 is shifted 180° in phase by the inverter circuit 25 and is applied to the adder circuit 21. (A subtractor circuit may of course alternatively be used which then takes the place of the parts 21 and 25 and subtracts the delayed signal from the undelayed signal).

The comb filters described are known per se from the previously mentioned Article, particularly FIG. 27. Exclusively the components of a first color difference signal U (comb filter 2) and of a second color difference signal V (comb filter 1) present in the PAL signal appear at the output. Their action together with the rest of the circuit arrangement may be illustrated with reference to the frequency characteristics shown in FIG. 4.

Figures 4A, 4B, 4C, 4D:
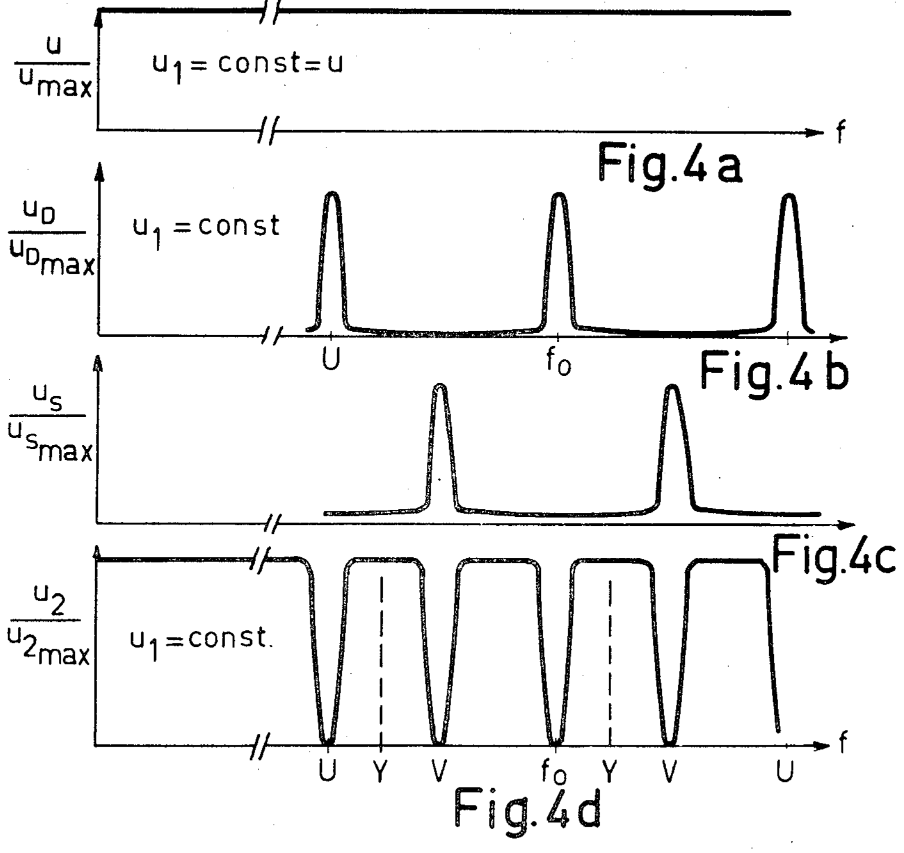

FIG. 4*a* illustrating the frequency characteristic of the delay element 5 shows that the total FBAS signal reaches the output of the subtractor circuit 3 in an unattenuated form. FIG. 4*b* and FIG. 4*c* show the frequency characteristics of the comb filters 2 and 1, respectively, which pass only the color difference signal components U and V, respectively, every time. The pass characteristics have sharper peaks as the positive feedback is larger. When the amplification of the amplifiers 6 and 7 is chosen to be such that the amplitude of the U and V components applied to the subtractor circuit has the same value as that of the U and V components in the FBAS signal, then they are compensated eminently in the signal at the output of the subtractor circuit 3 so that the total filter characteristic shown in FIG. 4*d* is produced.

Other properties of the circuit arrangement according to the invention are apparent from a quantitative analysis. The output voltage $U_2$, in so far as it is located in the frequency range of the chrominance signal, can be calculated from $$u_2=u_1-v_1 u_s-v_2 u_d \quad (1)$$

In this case $u_1$ is the input voltage, $u_s$ and $u_d$ are the output voltages of the comb filters 1 and 2, respectively. The quantities $u_1$, $u_2$, $u_s$ and $u_d$ represent complex voltage amplitudes. The references $v_1$ and $v_2$ indicate the amplification factors of the amplifiers 6 and 7.

The voltages $u_s$ and $u_d$ in accordance with equations 21 and 22 of the previously mentioned Articles are as follows:

$$\frac{u_s}{u_1}=\frac{1+\exp(-jwT)}{1-k_1\exp(-jwT)} \quad (2)$$

and $$\frac{u_d}{u_1}=\frac{1-\exp(-jwT)}{1+k_2\exp(-jwT)} \quad (3)$$

In these formulas $k_1$ and $k_2$ are the (positive) feedback factors ($k_1, K_2<1$) of the feedback networks 12 and 22; $w$ is the angular frequency. If the Equations 2 and 3 are substituted in the Equation 1 then this results in the following formula, provided that $v_1=v_2=v$ and $k_1=k_2=k$:

$$\frac{u_2}{u_1}=1-v\frac{2+2k\exp(-2jwT)}{1-k^2\exp(-2jwT)} \quad (4)$$

If $v$ is chosen to be such that in the Equation (4) the second term becomes 1 at a maximum (maximum values of this term occur as $\exp(-2jwT)=+1$), then the function value is zero, and in this case there must apply that $$v=\frac{1-k^2}{2+2k} \quad (5)$$

The zero values are located at the frequencies of the chrominance subcarriers, the U-components and the V-components for which there applies that $1/T=f_z(1-e/n)$. After substitution of the Equation (5) in the Equation (4) and after some derivation this results in:

$$\frac{u_2}{u_1}=\frac{k\times(1-\exp(-2jwT))}{1-k^2\exp(-2jwT)} \quad (6)$$

Equation (6) shows that for $k=0$ the output voltage $u_2$ becomes 0. This is readily evident because the action of the delay line 14 is eliminated by that of the delay line 24 because subtraction is effected once and addition is effected once. This means that a feedback ($k \neq 0$) is absolutely necessary.

The minimum zero values of the quotient $u_2/u_1$ occur, as already shown, at exp $(2-jwT) = +1$. The maximum values occur at exp $(-2jwT) = -1$. These values are located exactly in the middle between the minimum values and thus at the area of the components of the Y-signal. The maximum values are:

$$\frac{u_2}{u_1} = \frac{2k}{1+k^2} \text{ (for } k>0) \qquad (7)$$

The maximum value for $k = 0.7$ has a value of for example 0.94. The Y-components of the output signal $u_2$ — in so far as they are located in the frequency range of the chrominance signal — thus have an amplitude which is 6 percent lower than the Y-components in the input signal $u_1$ or the low-frequency components of the Y-signal applied to the input of the subtractor circuit. This slight difference, which is the slighter as $k$ is larger, may optionally be eliminated by an additional amplification of the high-frequency Y-components.

In case of a step of the Y (luminance) signal at the input of the circuit from 100 percent to 0, as is shown in FIG. 2*a*, the following takes place: the Y-signal provided through the delay element 5 or through the bandpass filter 4 occurs directly after the step 0 when the delay of the elements 4 and 5 is left out of consideration. The delay line 14 (24) acts, however, as a memory for the signal value present before the step. Since this value added to $U_1$ (or subtracted therefrom) yields $u_2$ ($u_d$) it must have the value $u_s + u_1$ ($u_d + u_1$). The signals provided by the delay lines 14 and 24 yield $u_s + u_d$ after addition likewise as before the step. However since (for $k = 0.7$) the Y-component of the signals coming through the comb filters reduces the Y-component of the signal $u_1$ by only 6 percent, this small component of the Y-signal only appears at the input and — because no signal is provided anymore through the amplifier element 5 — at the output of the subtractor device. As a result of the feedback to the inputs of the delay lines 14 and 24, a signal attenuated by the feedback factor $k$ is produced at the end of the line period, which signal is further attenuated at the end of the next line. The signal values occurring at the output of the subtractor circuits are, however, so small that they are not disturbing.

The circuit reacts in the same manner in case of one of the vertical color steps which occur rarely. Since the U and V components coming through the delay line have a large amplitude ( 100 percent of the U and V components present in the signal $u_1$) a severe color distortion might be produced at the outputs. This distortion may be prevented in known manner (compare the Internationale Elektronische Rundschau 1969, No. 8, page 199, FIG. S) by a chrominance subcarrier suppression circuit not further shown in the drawing. Such a chrominance subcarrier suppression circuit suppresses the greater part of the energy present in the chrominance signal in a limited region around the chrominance subcarrier.

What is claimed is:

1. A circuit for suppressing the color signal component of a composite color television signal comprising a pair of comb filters; means for applying at least said color signal component to said filters; each of said filters comprising a delay line having a delay substantially equal to one line period of said television signal and having an input coupled to receive said color signal component and an output, means coupled to said delay line output for combining the delayed and undelayed color signal component, a first of said combining means adding said signals, the remaining second combining means subtracting said delayed from said undelayed color signal components, means for feeding back a portion of said combining means output to the input of said respective delay lines; first and second means for amplifying the output signals from said combining means by selected values; and means for subtracting said amplified signals from said composite television signal; whereby a luminance signal is produced.

2. A circuit as claimed in claim 1 wherein said second combining means comprises a phase inverter coupled to the second filter delay line, and an adder coupled to said phase inverter and to receive the undelayed signal.

3. A circuit as claimed in claim 1 wherein said applying means comprises a bandpass filter for passing only the color signal component, said filter having a given time delay; and further comprising a delay line having a delay substantially equal to said bandpass filter delay and having an input coupled to receive said composite signal and an output coupled to said subtracting means.

4. A circuit as claimed in claim 1 wherein said amplifying means amplify by the same amount, and both of said feedback means satisfy the equation $v = (1 - k)/2 + 2k$ wherein $v$ is the value of said amplification, and $k$ is the value of said feedback, $k$ being greater than zero.

5. A circuit as claimed in claim 1 wherein both of said delay lines having a delay time that satisfies the equation $1/T = fz\,(1 - e/n)$ wherein *T is said delay time*, *fz* is the line frequency, *e* is equal to 0.25, and *n* equals 284.

* * * * *

PO-1050
(5/69)

UNITED STATES PATENT OFFICE
CERTIFICATE OF CORRECTION

Patent No. 3,707,596 Dated December 26, 1972

Inventor(s) KLAUS KUHN

It is certified that error appears in the above-identified patent and that said Letters Patent are hereby corrected as shown below:

IN THE CLAIMS

Column 6, line 50, "is said delay time" should not be italized;

Signed and sealed this 15th day of October 1974.

(SEAL)
Attest:

McCOY M. GIBSON JR.
Attesting Officer

C. MARSHALL DANN
Commissioner of Patents